United States Patent [19]

Leenhouts

[11] 4,295,083
[45] Oct. 13, 1981

[54] PULSED ENERGY STEPPING MOTOR POWER CONTROL UNIT

[75] Inventor: Albert C. Leenhouts, Harwinton, Conn.

[73] Assignee: The Superior Electric Company, Bristol, Conn.

[21] Appl. No.: 54,311

[22] Filed: Jul. 2, 1979

[51] Int. Cl.³ .............................................. G05B 19/40
[52] U.S. Cl. .................................... 318/696; 318/138; 318/254
[58] Field of Search ................ 318/696, 138, 254, 685

[56] References Cited

U.S. PATENT DOCUMENTS

| | | | |
|---|---|---|---|
| 3,903,467 | 9/1975 | Eckardt | 318/696 |
| 3,919,606 | 11/1975 | Nemoto | 318/138 X |
| 3,967,179 | 6/1976 | Loyzim | 318/696 |

Primary Examiner—B. Dobeck

[57] ABSTRACT

A power control unit causes a high supply voltage to be intermittently chopped to provide energy pulses in a core transformer and the energy in the core is discharged into a capacitor with the capacitor constituting the power source for a stepping motor and with the extent of the energy pulse accepted by the capacitor being determined by the condition of the capacitor which in turn is set by the instantaneous operating state of the motor.

26 Claims, 4 Drawing Figures

PULSED ENERGY STEPPING MOTOR POWER CONTROL UNIT

In use, a stepping motor is operated at over a wide speed range from standstill to a few thousands steps per second. As the motor includes windings and as each step requires a change of energization of at least one of the windings, the impedance of the motor thus varies with its speed. Accordingly, difficulties have been encountered when the motor is operated from the usual constant voltage power supply as a low value of voltage that is acceptable at standstill provides insufficient power at higher stepping speeds, while a high value of supply voltage, suitable for higher stepping speeds, will overpower the motor at standstill.

In order to provide an acceptable power supply, the most conventional, simplest and economical approach has been to provide resistors in series with the motor to decrease the effect of the change of impedance of the motor. However, such a system is quite power-wasting in addition to somewhat limiting the performance of the motor. Other heretofore known approaches have been to provide power controlling circuits such as chopping circuits which provide intermittent power by alternately connecting and disconnecting the motor from the power supply. While the latter are not generally power-wasting, they tend to be somewhat relatively expensive when used to operate small size motors, especially when components have to be capable of withstanding induced voltages and safety circuits are needed for possible short and open circuit conditions. Further, when the motor current is chopped, objectionable electrical and audible mechanical noises may be generated. Examples of power supplies that chop the power supply current rather than the motor winding current are disclosed in U.S. Pat. Nos. 3,809,991 and 3,967,179, both assigned to the assignee of the present invention.

It is accordingly an object of the present invention to provide a power control unit for a stepping motor which is quite inexpensive, usable with a wide variety of stepping motors and extremely efficient.

Another object of the present invention is to provide a power control unit for a stepping motor which, while capable of supplying the power in the manner needed by the instantaneous operating state of the motor, is easily caused to be open and short circuit proof in addition to enhancing the performance of the stepping motor over heretofore known resistor circuits.

A further object of the present invention is to achieve the above objects with a power control unit which intermittently effects a chopping connection and disconnection with the power source to form energy pulses, provides for the chopping to occur in other than the motor winding circuits and which utilizes a capacitor to receive the energy pulses and constitute the source of power for the motor windings thereby reducing eddy current losses in most motors.

In carrying out the present invention, there is provided a stepping motor having at least one winding whose energization is changed for each step in a manner well-known in the art. The winding is energized by being connected across a capacitor so that the power in the capacitor constitutes the power source for the motor. The capacitor, in turn, receives intermittent energy pulses from a source of D.C. power with the extent of the energy being absorbed by the capacitor from each pulse being set by the extent of the energy that the motor is demanding for its present operating state. Even more importantly, however, the values of the voltage and current attained by the capacitor from the energy pulses are those that are necessary for the instant operating condition of the motor, i.e., low voltage, high current for low speed operation and high voltage, low current for high speed operation.

Specifically, the present power control unit for providing the energy pulses includes a ferrite core transformer having a primary winding connected in series with a chopping transistor across a D.C. power source that may typically provide about 48 volts of rectified and filtered D.C. A steppeddown secondary winding of the transformer is connected through a diode across the capacitor. With this circuitry, current is permitted to flow in the primary winding unitl it reaches a preselected maximum value at which time the primary winding is disconnected from the power source for a set duration. During the primary winding current flowing period, the diode prevents current flow in the secondary winding which thus results in an energy charge being built up in the transformer. However, during the disconnect period, the energy appears as an induced current which is capable of passing through the diode into the capacitor to be absorbed by the capacitor.

The condition of the capacitor, i.e., its voltage and extent of discharge, however, dictates the extent of the energy pulse that it will accept in the fixed time period. For motor states requiring a low voltage, only a portion of the energy is accepted while for states requiring a high voltage, all the energy is accepted. Thus, the present power control unit is essentially a constant power source for the higher operating speeds of the motor, but a variable power source for the lower operating speeds of the motor and with the operating of the motor setting which type of power source will be effective.

Other features and advantages will hereinafer appear.

In the drawing

Figure 1:
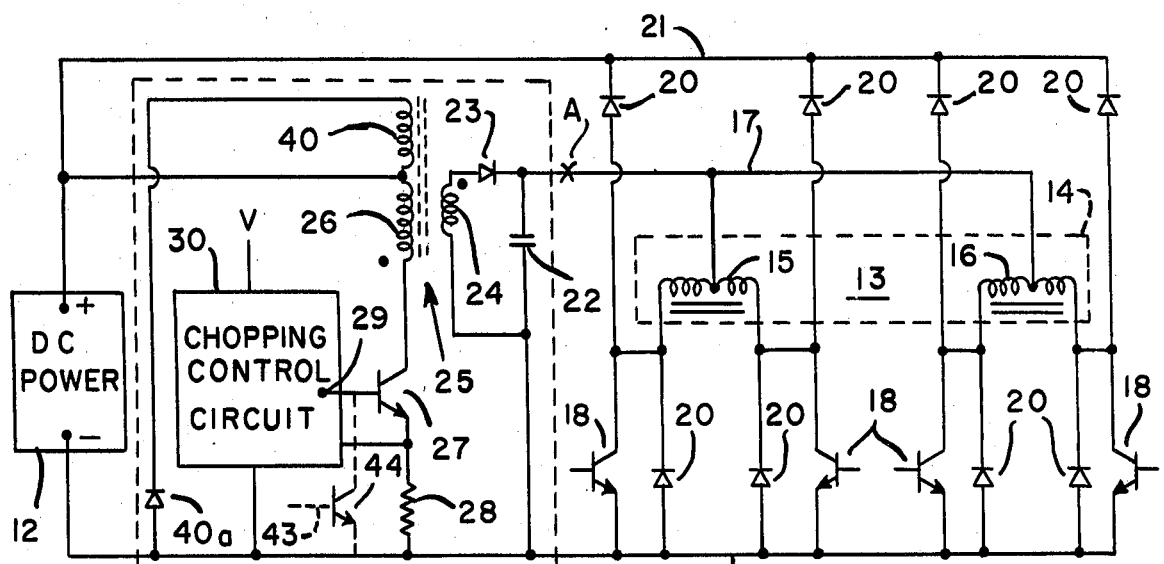
FIG. 1 is a block and schematic diagram of the present pulsed energy power control unit shown connected to one form of a stepping motor which it may energize.

Referring to the drawing, the present invention of a pulsed energy stepping motor power control unit is generally indicated by the reference numeral 10 and is enclosed within a dotted line block 11 in FIG. 1. The unit 10 is electrically positioned between a source of D.C. power 12 which may be obtained by rectifying AC, and a stepping motor 13 contained within a dotted line block 14. The motor 13, in this embodiment, has two winding phases 15 and 16, each of which is wound to effect bifilar windings.

The center of each winding phase is connected to a motor supply positive lead 17 while the ends of the winding phases are connected through switching transistors 18 to a motor supply negative lead 19. In accordance with heretofore well-known practices, the conduction and non-conduction of the switching transistors 18 are changed according to a preselected sequence to provide motor motion with each change of conduction energizing the motor to produce a motor step.

Further, as is well-known in the art, eight diodes 20 are connected as shown in order to enable induced current created in the bifilar windings when a winding becomes denergized to flow to an induced current lead 21. The lead 21 is connected to the + side of the power source 12 so that the induced current is thereby returned to the power source. The return of the induced current energy to the power source, rather than to the motor supply source, constitutes a feature of the present invention for reasons which will hereinafter appear.

The motor supply leads 17 and 19 are connected across a capacitor 22 with the capacitor 22 supplying the energizing power for the motor windings. The capacitor is also connected through a diode 23 across a secondary winding 24 of a ferrite transformer 25. The transformer 25 has a primary winding 26 that is connected in series with a chopping transistor 27 and a resistor 28 across the D.C. power source 12. The base of the transistor 27 is connected to the output 29 of a chopping control circuit 30 which is more specifically shown in FIG. 2.

The chopping control circuit 30 causes the transistor 27 to conduct until a preselected value of current is flowing through the primary winding 26 and then ceases conduction for a fixed time interval after which the transistor 27 is again rendered conducting to repeat the chopping cycle. One cycle duration that may occur is around 40 microseconds with a fixed off time of 20 microseconds.

Figure 2:
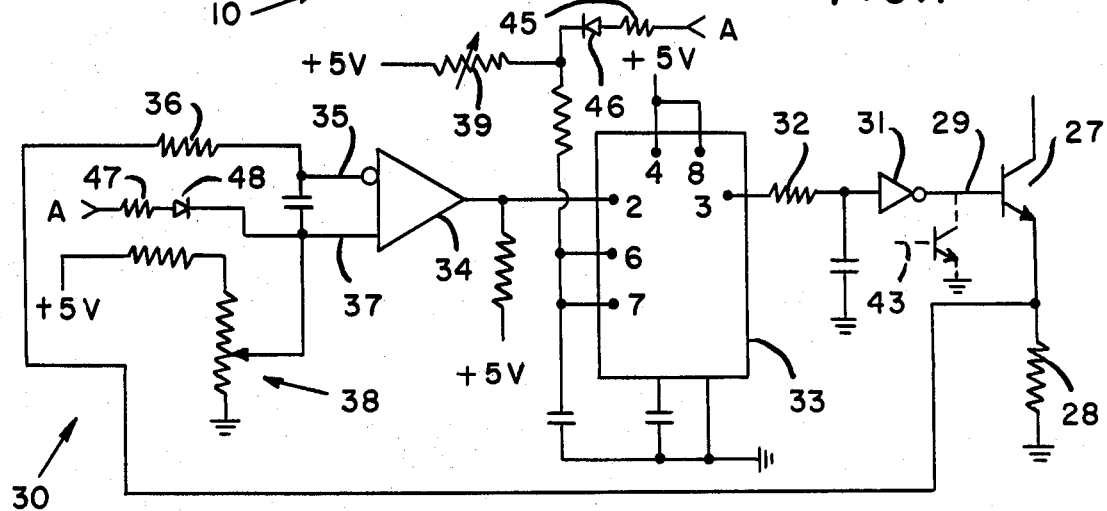
FIG. 2 is a schematic diagram of the chopping circuit for the primary winding of the control unit.

In FIG. 2, the transistor 27 and resistor 28 are shown with the base of the former being connected through an inverting amplifier 31 and a resistor 32 to the output terminal 3 of a type 555 timer 33. The terminal 2 of the timer is connected to the output of a comparator 34 having an inverting input 35 connected through a resistor 36 to the junction between the transistor 27 and resistor 28 so that a value of voltage related to the value of current flowing through the primary winding appears as one input to the comparator. Another input 37 has a constant value voltage applied thereto as obtained from the tap of an adjustable resistor 38 connected to a source of positive voltage.

When the value of the voltage at the inverting input 35 becomes greater than the constant value at the other input 37, the terminal 2 becomes logic zero, shifting the output terminal 3 to logic high which through the inverter 31 causes transistor 27 to become non-conducting. After lapse of the fixed time period, the output terminal 3 goes logic low, effecting conduction of the transistor 27 until the next maximum value of current occurs. The time period of non-conduction may be adjusted by an adjustable resistor 39 connected to the 6 and 7 terminals of the timer 33.

In the operation of the power control unit, the motor impedance sets the value of voltage that appears across the capacitor as the capacitor will have its voltage decrease as current flows through the motor. Thus, at low or standstill speeds, the impedance of the motor is low, and hence a large amount of current from the capacitor 22 flows through the winding with the voltage across the capacitor accordingly becoming low. When the transistor 27 becomes non-conducting, the energy pulse becomes a low voltage-long duration current flow pulse with the voltage being enough to overcome the capacitor voltage to force current into the capacitor. However, the transfer of this kind of induced energy requires a relatively long time and the fixed time period expires before complete transferrence so that only a portion of the energy pulse is transferred and the core only becomes partially discharged. Accordingly, at low speed or standstill, the voltage across the motor is maintained low and the power required by the motor is low so that the present invention only supplies a small quantity of power.

For high stepping rates, the motor impedance is high causing the capacitor voltage to be high. The energy pulse accordingly becomes a high voltage-short duration current flow pulse and in this form, the energy is quickly transferred to the capacitor. Thus, the transformer becomes completely discharged by the capacitor accepting the complete energy pulse within the fixed non-conducting period. When this occurs, the maximum amount of power capable of being transmitted by the power control unit is being transmitted. This maximum value accordingly sets the size of motor with which the present control unit may be fully utilized.

It will be noted that when only a portion of the energy pulse is transferred, that a shorter time is required for the transistor 27 to conduct in order to have the maximum current flow in the primary winding than if there were complete transfer of the energy pulse. Thus, the duration of the chopping cycle will be somewhat longer during maximum power transfer but as the cycle duration is not very critical to control the power, this variation in the cycle duration has no significant effect on the performance of the unit. One typical variation is around 10%.

Figure 3:
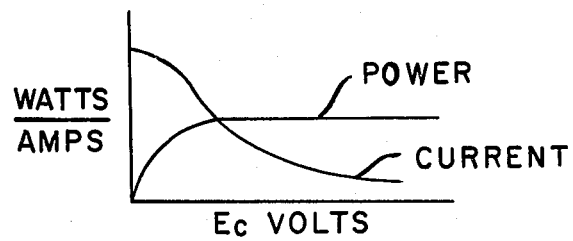
FIG. 3 is a plot of motor power and current vs. the capacitor voltage.

The above operation is displayed in graph form in FIG. 3 wherein the voltage on the capacitor is plotted on the abscissa while the ordinate depicts watts and amperes. The power curve initially increases until the intersection between it and a current curve and thereafter remains constant in view of each energy pulse being completely transferred. The current curve initially decreases somewhat non-linearly until after the intersection when it essentially becomes hyperbolic to maintain the constant power relationship as the voltage linearly increases.

In one embodiment of the invention for providing a maximum of 72 watts of power into the motor, the capacitor 22 is about 150 microfarads, the secondary winding has 8 turns and the primary winding has 16 turns. With the D.C. source 12 supplying 48 volts, the nonconducting time of transistor 27 being 20 microseconds, the conducting time of transistor 27, when complete transfer occurs essentially equalling the conducting time, of 20 microseconds. The power in the primary winding is 1.5 amps or 72 watts, the peak current through the transistor 27 is about 6 amperes and essentially all of this power is transferred to the capacitor. The size of the capacitor is not especially critical however, its maximum size should be such as to enable it to respond quickly to any change in the motor's operation while its smallest size should be able to store sufficient energy.

As previously mentioned, the currents induced in the winding phases are directed to the lead 21 and then directed to the positive side of the power source to be available for subsequent reuse. The present power source is thereby extremely efficient since the power drawn from the power source is essentially that consumed by the motor except for the slight loss in the components of the circuit.

The transformer 25 is a step-down tansformer as for example having a ratio of 2 to 1 to change 48 volts to 24 volts so that complete transfer will occur when the capacitor voltage is 24 volts or more so that the power source voltage is a higher voltage than the voltage supplied to the motor. By discharging the induced currents into the higher voltage power source, the induced energy in the winding phases is transferred quicker than if it is discharged into a lower voltage source thereby permitting the next energization of the winding phase to occur quicker. Moreover, as the energizing current from the capacitor increases slowly from when the induced current ceases to flow, there is a substantial improvement in the single step response of the motor.

In the event that a short circuit should develop in the motor, the present invention minimizes the power transferred by the voltage in the capacitor becoming quite low thereby reducing the quantity of each energy pulse that is transferred into the capacitor and hence to the short circuit. On the other hand, if an open circuit develops between the leads 17 and 19, the capacitor will be continuously charged. If desired, the voltage of the capacitor may be limited to a maximum value by providing a flyback winding 40 on the primary winding 26 connected through a diode 40a to the negative side of the power source. With this construction, the maximum voltage attainable by the capacitor will be the turns ratio of the secondary and flyback windings times the voltage of the power source 12.

Figure 4:
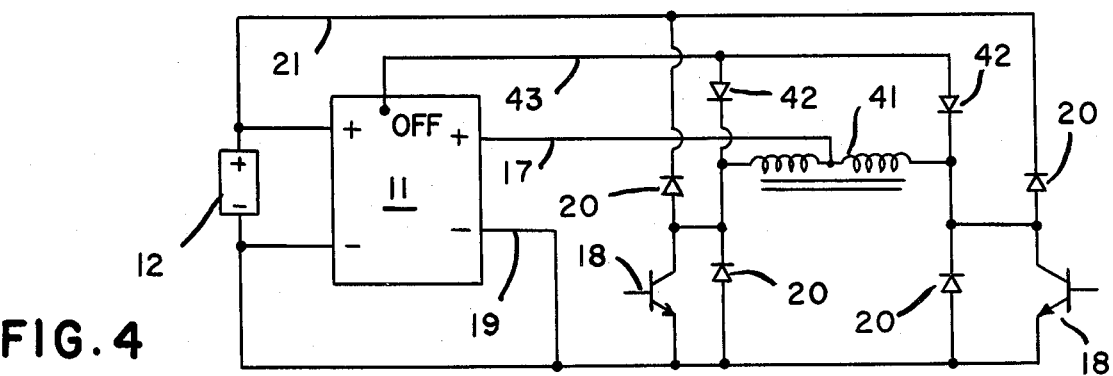
FIG. 4 is a diagram similar to FIG. 1 showing a different interconnection between the present power control unit and a motor winding.

While the above described embodiment utilizes one power control unit for energizing both phases, it is also contemplated that a separate control unit may be used for each phase. Thus, as shown in FIG. 4, the control unit 11 is connected to energize only one winding phase 41 of a stepping motor. The phase has the heretofore explained switching transistors 18 and diodes 20 for controlling the energization of the winding and also directing induced current to the induced current lead 21. With this construction of a power control unit for each winding phase, then merely doubling the number of power control units doubles the size of a twophase motor that may be energized, or if a three winding phase motor, triples the power that can be supplied by the use of three units.

It is also contemplated that if desired, a plurality of power units may be connected in parallel to increase the quantity of power controlled to a motor which has a rating larger than the maximum capacity of a single unit.

The circuit in FIG. 4 of one power unit per winding phase has also been found advantageous when it is desired to independently control the voltage to each phase as may occur in fractional stepping. To prevent an excessive initial current surge when a winding phase is energized after being deenergized, a pair of diodes 42 may be connected to the ends of the winding phase and a lead 43 with the lead 43 being connected to operate a switch 44 connected to ground the base of transistor 27 of the power unit 12. When both switching transistors 18 are non-conducting, both winding ends will be at the same D.C. voltage which when applied to the power unit, prevents conduction of the transistor 27.

While the above described embodiment provides a fixed off time of the tranistor 27, it may be found advantageous when a somewhat higher maximum power is desired, to shorten the offtime to thereby increase the rate of the energy pulses or alternatively to increase the maximum current or both together. In the former instance, the point A on lead 17 is connected through a resistor 45 and diode 46 to the adjustable resistor 39, while in the latter instance, the point A is connected to the input 37 of the comparator through a resistor 47 and a diode 48.

It should be also noted that if desired to change the power to a winding phase during operation of the motor as when fractional stepping, that a variable voltage source may be substituted for the adjustable resistor 38.

Though the winding phase disclosed herein is of the bifilar type, the present power control unit course may be used with most stepping motors having single coil windings, if desired.

It will accordingly be understood that there has been disclosed a power control unit for a stepping motor that though providing the energizing power to the motor as the motor demands, is quite efficient in operation. The supply produces a series of intermittent energy pulses which assume the form of an inductive charge and the charge is then transferred to a capacitor. The capacitor is connected to be the sole source of energy for at least one winding of the stepping motor and assumes an electrical condition that is dictated by the motor requirements as set by the motor's instantaneous operational state. The extent of the pulse transferred to the capacitor during a transfer time is accordingly determined by the capacitor condition which in turn becomes essentially equal to the power that is being consumed by the motor. Thus, the power control unit accordingly supplies essentially only the power that the motor requires. In the event that the winding produces induced currents, the present unit enables these currents to be returned to the power source for reuse, thereby further correlating the power utilized with the motor's operating state.

Variations and modifications may be made within the scope of the claims and portions of the improvements may be used without others.

I claim:

1. A power control unit for supplying power to a winding of a stepping motor, comprising a source of D.C. power, a capacitor, step-switching means for connecting the motor winding intermittently across the capacitor at a variable frequency that determines the motor's speed, thereby causing the capacitor to energize said winding as determined by the capacitor's charge and voltage and the impedance of said winding at the step-switching frequency, and means operable at a frequency independent of the frequency of said step-switching means for receiving pulses of energy up to a maximum amount of energy in each pulse from said D.C. source and for supplying pulses to said capacitor, said receiving and supplying means being responsive to the voltage of the capacitor to deliver to the capacitor amounts of pulse energy varying as a direct function of the capacitor voltage at least up to a predetermined frequency of said step-switching means.

2. The invention as in claim 1 in which the receiving and supplying means alternately receives energy from the D.C. source and delivers energy to said capacitor.

3. The invention as defined in claim 1 in which each pulse is supplied during the same essentially fixed time interval.

4. The invention as defined in claim 1 in which there are means connected to sense the electrical condition of the capacitor for altering the duration of the fixed time interval.

5. The invention as defined in claim 1 in which there are means interconnected with the receiving and supplying means for limiting the maximum voltage attainable by the capacitor.

6. The invention as defined in claim 1 in which there are means for directing any induced current created in the winding upon the winding being deenergized to the power source.

7. The invention as defined in claim 1 in which the means for supplying energy pulses produces a pulse at least every 100 microseconds.

8. A power control unit for supplying power to a winding of a stepping motor that is alternately energized and deenergized comprising a capacitor, means adapted to connect the winding across the capacitor to cause the capacitor to supply the power for energizing the winding, a source of D.C. power, and means for receiving power from the source and supplying intermittent pulses of electrical energy to the capacitor from the D.C. power source at a rate that is essentially independent of the motor speed, each pulse being supplied during an essentially fixed time interval, the electrical condition of the capacitor determining the extent of each pulse supplied to the capacitor, the means for receiving and supplying pulses including an inductance means for alternately causing current flow from the power source through the inductance means and a pulse being produced by the energy stored in the inductance means upon the stoppage of current flow from the power source.

9. The invention as defined in claim 8 in which the inductance means includes a transformer having a primary winding that is connected across the power source and a secondary winding that is connected across the capacitor.

10. The invention as defined in claim 9 in which there are means between the secondary winding and the capacitor for preventing flow of energy to the capacitor when the primary winding is connected to the power source.

11. The invention as defined in claim 10 in which the means for receiving power from the power source includes means for stopping the receiving when a selected value of current flows in the primary winding.

12. The invention as defined in claim 11 in which the means for receiving includes means for reconnecting the primary winding to the power source after the same fixed time interval.

13. The invention as defined in claim 9 in which there is a flyback winding wound on the transformer and means for connecting the flyback winding across the power source whereby the flyback winding limits the maximum voltage attainable by the capacitor.

14. The invention as defined in claim 11 in which there are means connected to sense the electrical condition of the capacitor for altering the selected value of current that flows in the primary winding.

15. The method of supplying energizing power to a winding of a stepping motor from a power source comprising the steps of forming intermittent inductive energy pulses in an inductance by alternate connection and disconnection periods to the power source, directing the inductive energy pulses to a storage means during the period of disconnection, storing the energy pulse in the storage means and energizing the motor windings from the energy stored in the storage means.

16. The invention as defined in claim 15 in which the step of storing includes storing only a portion of the inductive energy pulse when the motor winding requires a lesser extent of energization.

17. The invention as defined in claim 15 in which the step of storing includes storing the complete inductive pulse when the motor winding requires a greater extent of energization.

18. The invention as defined in claim 15 in which there is the step of decreasing the duration of the disconnection period in accordance with an electrical condition of the storage means.

19. The invention as defined in claim 15 in which there is the step of changing the energy in each inductive energy pulse in accordance with an electrical condition of the storage means.

20. A power control circuit for supplying power to the winding of a stepping motor, including a source of D.C. voltage, a capacitor, means for switching the motor winding intermittently across the capacitor, a step-down transformer, a chopper between the D.C. source and the input of the transformer, a rectifier between the output of the transformer and the capacitor, and substantially resistance-free means including rectifier means between said motor winding and said D.C. source for selectively coupling any voltage induced in said motor winding in excess of that of the D.C. source back to said D.C. source.

21. A power control circuit for supplying power to the winding of a stepping motor, including a source of D.C. voltage, a capacitor, means for switching the motor winding across the capacitor, and means including a chopper and a transformer for coupling the D.C. source to the capacitor, said transformer having a secondary and fly-back winding, rectifier means between the secondary and the capacitor, and a fly-back circuit including said fly-back winding and a rectifier across the D.C. source for limiting the maximum voltage attainable by the capacitor.

22. Apparatus for supplying power to a winding of a stepping motor including a source of D.C. power, an inductance means, intermittent switching means between said D.C. source and said inductance means for forming intermittent inductive energy pulses, a storage capacitor, means directing the inductive energy pulses to said storage capacitor during periods of disconnection of said inductive pulse forming means, and stepping means for connecting said capacitor across said motor winding intermittently to promote stepping of the motor.

23. Apparatus as in claim 22 wherein said intermittent switching means is adapted to develop a uniform maximum energy in the magnetic field of said inductance means in forming said pulses, and wherein said capacitor stores impulses of progressively larger amounts of energy less than said maximum energy as the frequency of the step-switching means of said motor winding is increased from standstill.

24. Apparatus as in claim 23 wherein said capacitor stores pulses of said maximum energy at frequencies of said step-switching means at and above a given frequency.

25. Apparatus as in claim 22 including means for sensing the voltage of the capacitor coupled to said intermittent switching means for adjusting the duration of the disconnection periods of said intermittent switching means.

26. Apparatus as in claim 22 including means for sensing the voltage of the capacitor for controlling said intermittent switching means for accordingly determining the energy in each inductive energy pulse.

* * * * *